July 16, 1940.  T. G. SCHMEISER  2,207,826
TRACTION DEVICE
Filed Feb. 2, 1938  2 Sheets-Sheet 1

INVENTOR
T. G. Schmeiser
BY
ATTORNEY

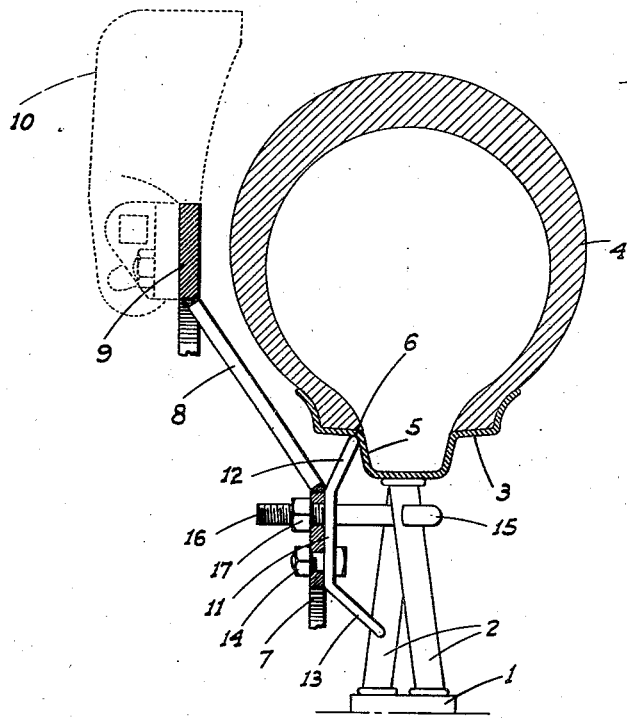
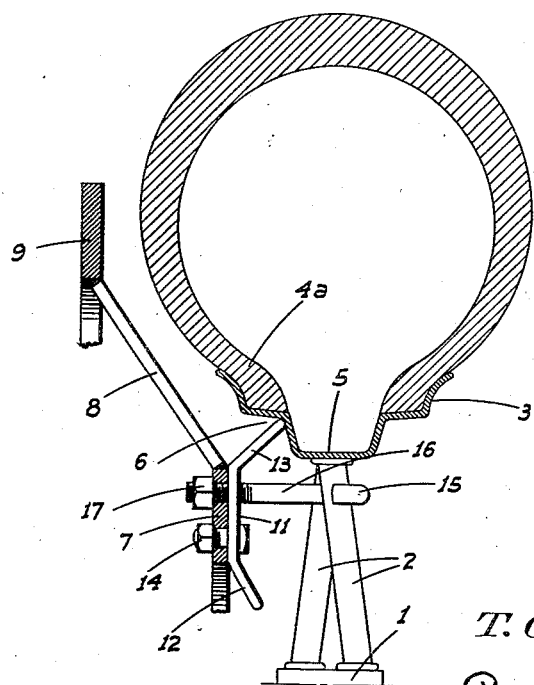

Patented July 16, 1940

2,207,826

UNITED STATES PATENT OFFICE 2,207,826

TRACTION DEVICE

Theodore G. Schmeiser, Fresno, Calif.

Application February 2, 1938, Serial No. 188,277

4 Claims. (Cl. 301—40)

This invention relates generally to a lug mounting unit for rubber tired tractor wheels and in particular the invention is directed to an attaching device for a lug mounting unit of the character shown in my copending application for United States Letters Patent, Serial No. 187,417, filed January 28, 1938.

The lug mounting unit attaching arrangement shown in the copending application is satisfactory when used in connection with a disc or similar type tractor wheel and to which the inner circular band of the lug mounting unit can be bolted in face-to-face engagement. However, when the lug mounting unit is to be attached to a spoke type tractor wheel, a different attaching device must be employed as the spokes of the wheel do not present a flat surface against which the inner band of the lug mounting unit can be secured, nor any means to positively hold the unit against radial displacement.

It is therefore the principal object of the present invention to provide a device for rigidly attaching a lug mounting unit, of the type shown in the above identified copending application, to a spoke type tractor wheel.

An additional object of the invention is the provision of such an attaching device including supporting and locating elements arranged to be disposed in selected positions whereby the lug mounting unit may be disposed different distances laterally of the wheel depending on the size tire used.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a fragmentary cross section of a spoke type tractor wheel with the lug mounting unit attached thereto with my device and illustrating the position of the locating and supporting elements when a tire of one size is used.

Figure 3 is a similar view but illustrating the position of the elements when a tire of relatively larger size is used.

Figure 1:
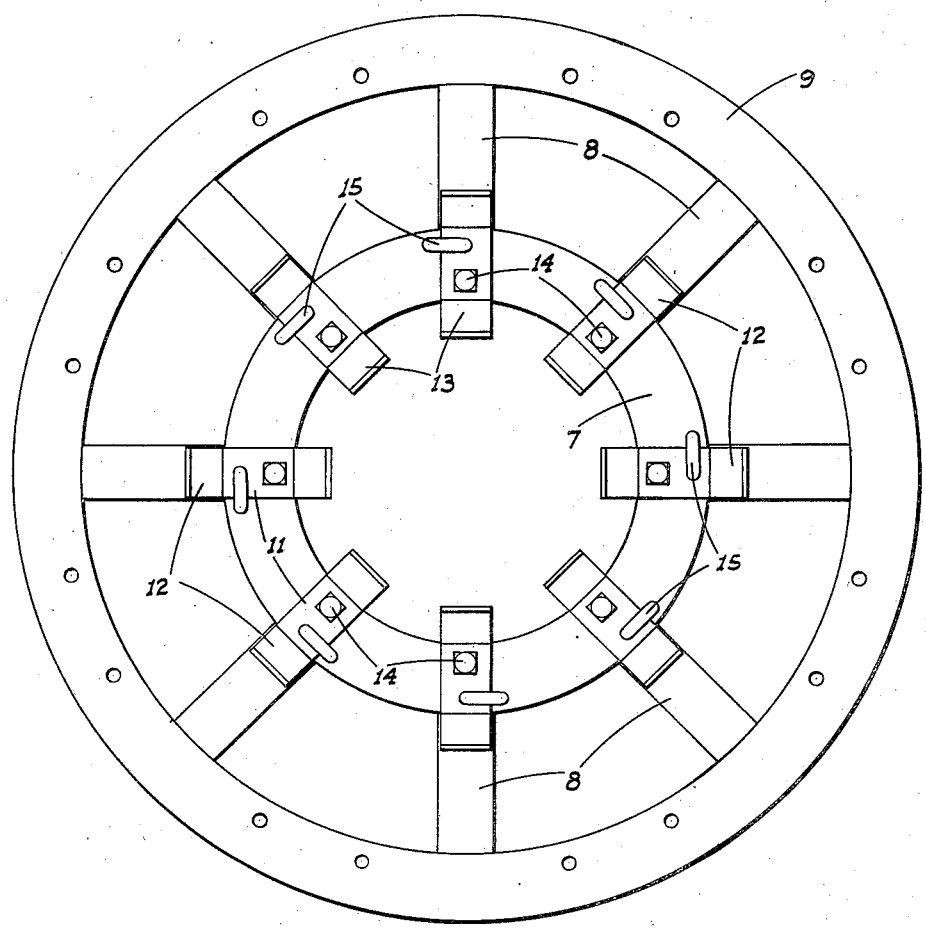
Figure 1 is an inner-face view of a lug mounting unit incorporating the invention.

Referring now more particularly to the characters of reference on the drawings, the numeral 1 indicates the hub of a spoke type tractor wheel, the wheel including radial but laterally staggered spokes 2 and a tire engaging rim indicated generally at 3. A conventional rubber tire 4 is mounted on the rim. The rim 3 includes a felly 5, such felly forming the drop center of the rim as is standard practice. The felly at the juncture with the remainder of the rim forms a laterally facing corner or concavity 6.

The lug mounting unit is of substantially the same construction as shown in the above identified copending application and includes a circular band 7 of less diameter than the rim and disposed outwardly of the wheel in concentric relation thereto. Arms 8 are butt-welded at one end to the periphery of band 7 and radiate therefrom in an outwardly deflecting direction; such arms at their other ends being butt-welded to and supporting another circular band 9 which is disposed outwardly of the tire 4 and substantially in the circular plane thereof. This band 9 has the lugs mounted thereon in the same manner as in such copending application, one of such lugs being indicated at 10 in dotted lines in Fig. 2.

A plurality of supporting and locating elements are secured to the inner face of the band 7 radially thereof in circumferentially spaced relation; each of said elements including a flat base member 11 and inwardly bent diverging fingers 12 and 13 respectively formed on the ends thereof. Bolts 14 invertibly secure the base of each element to the band 7. The fingers 12 of the elements are shorter than fingers 13 and both fingers 12 and 13 are disposed at an obtuse angle to the inner face of the base member 11, the angle of fingers 12 being greater than that of fingers 13.

A hook bolt 15 projects inwardly from each element, the shank 16 of the bolt passing through registering holes in the element and band and having a nut 17 threaded on the outer end portion thereof.

In use the elements are bolted on the band 7 with either the fingers 12 or 13 extending radially out from the band 7. These extending fingers are of a length such that they will engage in the annular corner 6 of the wheel rim. The length and angularity of the fingers are proportioned so that regardless of whether fingers 12 or 13 are in use, their outer ends are the same distance from the center of the wheel. Thus, the fingers will always fit in the annular corner 6. The hook bolts 15 are then engaged with certain alternate spokes 2 of the wheel and preferably those which diverge from the rim laterally away from band 7. By engaging the hook bolts with such spokes, the relatively long fingers 13 can extend between the intermediate spokes which diverge laterally toward band 7, as clearly shown in Fig. 2. The nuts 17 are then tightened drawing the fingers into positive engagement with the rim and rigidly locating the lug mounting unit on the wheel and concentric therewith so that no radial play is possible.

In Fig. 2 I illustrate the fingers 12 as extending radially out to engage the rim and locate the lug mounting unit properly relative to one size tire. If a larger tire is used, as shown at 4a in Fig. 3, the elements are reversed and fingers 13 disposed to extend out for engagement with the rim corner. In this event, the greater length and angle of fingers 13 locates the lug mounting unit a greater distance laterally of the wheel allowing proper clearance between the tire 4a and band 9.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Means for rigidly connecting a traction increasing device on a tractor wheel comprising, with a rim on the wheel formed with an annular concavity facing laterally outwardly, an endless band included with said device and adapted to be disposed laterally outwardly from the rim, fingers rigid with said band and projecting laterally toward the rim concavity for removable locating engagement therein and means on the band for removable holding engagement with the wheel inwardly of the rim.

2. Means for rigidly connecting a traction increasing device on a tractor wheel comprising, with a rim on the wheel formed with an annular concavity facing laterally outwardly and radially inwardly, an endless band of smaller diameter than the rim included with said device and adapted to be disposed laterally outwardly from and concentric with the rim, circumferentially spaced fingers rigid with the band projecting laterally in and radially outwardly therefrom to engage said concavity in removable locating engagement and disengageable means between the band and wheel to draw them laterally together.

3. Means for rigidly connecting a traction increasing device on a tractor wheel comprising, with a rim on the wheel formed with an annular concavity facing laterally outwardly and radially inwardly, an endless band of smaller diameter than the rim included with said device and adapted to be disposed laterally outwardly from and concentric with the rim, circumferentially spaced finger units on the band, each unit comprising a pair of fingers to alternately engage at their outer end in the rim concavity, the fingers extending laterally inwardly of the band different amounts and in opposite radial directions, means detachably mounting each unit on the band so that either finger thereof may be disposed in position to engage the rim concavity and means between the band and wheel to pull the two laterally together.

4. Means for rigidly connecting a traction increasing device on a tractor wheel comprising, with a rim on the wheel formed with an annular concavity facing laterally outwardly and radially inwardly, an endless band of smaller diameter than the rim included with said device and adapted to be disposed laterally outwardly from and concentric with the rim, circumferentially spaced finger units on the band, each unit comprising a flat central portion adapted to abut against the laterally inner face of the band and fingers to alternately engage in the rim concavity, the fingers projecting in opposite directions radially from the ends of the central portion and laterally inwardly different distances, means detachably mounting the units on the band so that either fingers may extend radially outwardly therefrom and means between the band and wheel to pull the two laterally together and maintain the band against outward lateral and relative rotative movement.

THEODORE G. SCHMEISER.